United States Patent
Moore et al.

(10) Patent No.: US 7,584,229 B2
(45) Date of Patent: Sep. 1, 2009

(54) METHOD AND SYSTEM FOR PRIORITY-BASED ALLOCATION IN A STORAGE POOL

(75) Inventors: William H. Moore, Fremont, CA (US); Darrin P. Johnson, Mountain View, CA (US); Jeffrey S. Bonwick, Los Altos, CA (US); Tabriz I. Holtz, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 234 days.

(21) Appl. No.: 11/591,425

(22) Filed: Oct. 31, 2006

(65) Prior Publication Data

US 2008/0104150 A1 May 1, 2008

(51) Int. Cl.
*G06F 17/30* (2006.01)
(52) U.S. Cl. ........................... 707/205; 711/158
(58) Field of Classification Search ............... None
See application file for complete search history.

(56) References Cited

U.S. PATENT DOCUMENTS

| | | | |
|---|---|---|---|
| 4,144,522 A | 3/1979 | Kageyama et al. | |
| 5,129,085 A | 7/1992 | Yamasaki et al. | |
| 5,155,847 A | 10/1992 | Kirouac et al. | |
| 5,371,885 A | 12/1994 | Letwin | |
| 5,403,639 A | 4/1995 | Belsan et al. | |
| 5,410,667 A | 4/1995 | Belsan et al. | |
| 5,675,802 A | 10/1997 | Allen et al. | |
| 5,819,292 A | 10/1998 | Hitz et al. | |
| 6,209,111 B1 | 3/2001 | Kadyk et al. | |
| 6,341,341 B1 | 1/2002 | Grummon et al. | |
| 6,542,972 B2 * | 4/2003 | Ignatius et al. | 711/154 |
| 6,745,284 B1 | 6/2004 | Lee et al. | |
| 6,745,305 B2 | 6/2004 | McDowell | |
| 6,795,966 B1 | 9/2004 | Lim et al. | |
| 6,829,617 B2 | 12/2004 | Sawdon et al. | |
| 6,857,001 B2 | 2/2005 | Hitz et al. | |
| 6,892,211 B2 | 5/2005 | Hitz et al. | |
| 7,133,964 B2 | 7/2005 | Rodrigues et al. | |
| 7,007,196 B2 | 2/2006 | Lee et al. | |
| 7,032,154 B2 | 4/2006 | Kidorf et al. | |
| 7,043,677 B1 | 5/2006 | Li | |
| 7,162,486 B2 | 1/2007 | Patel et al. | |

(Continued)

OTHER PUBLICATIONS

Sandberg, R. et al.; "Design and Implementation of the Sun Network Filesystem"; Sun Microsystems, Inc., 1985 USENIX Conference (12 pages).

(Continued)

*Primary Examiner*—John E Breene
*Assistant Examiner*—Thu-Nguyet Le
(74) *Attorney, Agent, or Firm*—Osha • Liang LLP (57) ABSTRACT

A method for priority-based allocation in a storage pool involves receiving a request to write a data item in the storage pool, where the storage pool includes multiple metaslabs, and where each of the metaslabs includes a contiguous region of data. The method further involves determining a target metaslab selected from the multiple metaslabs by comparing multiple allocation priorities, where each of the allocation priorities is associated with one of the metaslabs, allocating a block to the target metaslab, and writing the block to the target metaslab, where the block includes a portion of the data item.

18 Claims, 9 Drawing Sheets

U.S. PATENT DOCUMENTS

| | | | |
|---|---|---|---|
| 7,174,352 | B2 | 2/2007 | Kleiman et al. |
| 7,200,715 | B2 | 4/2007 | Kleiman et al. |
| 7,225,211 | B1* | 5/2007 | Colgrove et al. ............ 707/205 |
| 2002/0004883 | A1 | 1/2002 | Nguyen et al. |
| 2002/0055942 | A1 | 5/2002 | Reynolds |
| 2002/0087788 | A1 | 7/2002 | Morris |
| 2002/0124137 | A1* | 9/2002 | Ulrich et al. ................ 711/113 |
| 2002/0161972 | A1 | 10/2002 | Talagala et al. |
| 2003/0033477 | A1 | 2/2003 | Johnson |
| 2003/0126107 | A1 | 7/2003 | Yamagami |
| 2003/0145167 | A1 | 7/2003 | Tomita |
| 2003/0188090 | A1* | 10/2003 | Darnell et al. .............. 711/108 |
| 2004/0098720 | A1 | 5/2004 | Hooper |
| 2004/0107314 | A1 | 6/2004 | Kim et al. |
| 2004/0123063 | A1 | 6/2004 | Dalal et al. |
| 2004/0225834 | A1 | 11/2004 | Lu et al. |
| 2004/0234000 | A1 | 11/2004 | Page |
| 2005/0010620 | A1 | 1/2005 | Silvers et al. |
| 2005/0097270 | A1 | 5/2005 | Kleiman et al. |
| 2005/0235154 | A1 | 10/2005 | Serret-Avila |
| 2006/0168409 | A1 | 7/2006 | Kahn et al. |
| 2006/0218644 | A1 | 9/2006 | Niles et al. |
| 2006/0256965 | A1 | 11/2006 | Rowe |

OTHER PUBLICATIONS

McKusick, M. K. et al.; "A Fast File System for UNIX"; ACM Transaction on Computer Systems, vol. 2, No. 3, Aug. 1984, pp. 181-197 (17 pages).
Astrahan, M.M. et al.; "System R: Relational Approach to Database Management"; ACM Transactions on Database Systems, vol. 1, No. 2, Jun. 1976, pp. 97-137 (41 pages).
"VERITAS File System 3.4 Administrator's Guide" VERITAS Software Corporation, Nov. 2000, http://www.veritas.com; pp. 1-227 (227 pages).
Czezatke C. et al.; "Linlogfs: A Log-Structured Filesystem for Linux"; The USENIX Association, Proceedings of FREENIX Track: 2000 USENIX Annual Technical Conference, San Diego, California, Jun. 18-23, 2000 (13 pages).
Osorio, N. et al.; "Guidelines for Using Snapshot Storage Systems for Oracle Databases"; Oracle Corporation, Oct. 2001 (13 pages).
Quinlan, S.; "A Cached WORM File System"; AT&T Bell Laboratories, Murry Hill, New Jersey; Software-Practice and Experience, vol. 21(12), pp. 1289-1299, Dec. 1991 (11 pages).
Sun StorEdge Instant Image 2.0 System Administrator's Guide; Sun Microsystems, Inc., Feb. 2000, Revision A (106 pages).
Ylonen, T.; "Concurrent Shadow Paging: A New Direction for Database Research"; Laboratory of Information Processing Science, Helsinki University of Technology, SF-02150, Espoo, Finland, 1992 (8 pages).
Popek, G. et al.; "The LOCUS Distributed System Architecture"; The MIT Press, Cambridge, Massachusetts, 1985 The Massachusetts Institute of Technology (8 pages).
Gray, J. et al.; "The Recovery Manager of the System R Database Manager"; Computing Surveys, vol. 13, No. 2, Jun. 1981 (20 pages).
Schilling, J.; "Enrwurf und Implementierung eines schnellen Filesystems fur Unix unter besonderer Berucksichtigung der technischen Parameter optischer Speichermedien und multimedialer Anwendungen"; Diplomarbeir Jorg Schilling, eingereicht am May 23, 1991 an der TU Berlin, and English Translation (245 pages).
Ylonen, T.; "Concurrent Shadow Paging: Snapshots, Read-Only Transactions, and On-The-Fly Multi-Level Incremental Dumping"; Laboratory of Information Processing Science, Helsinki University of Technology, FIN-02150, Espoo, Finland, 1993 (22 pages).
"The Enterprise Challenge Served by Snapshot"; Whitepaper, 2001 LSI Logic Corporation (8 pages).
Agrawal, R. et al.; "Integrated Concurrency Control and Recovery Mechanisms: Design and Performance Evaluation"; ACM Transactions on Database Systems, vol. 10, No. 4, Dec. 1985, pp. 529-564 (36 pages).
Suresh, Babu S.; "Persistent Snapshots"; Department of Computer Science and Automation, Indian Institute of Science, Bangalore—560 012, Jan. 2000 (38 pages.).
"Proceedings of the 5th Annual Linux Showcase & Conference" USENIX Association, Oakland, California, Nov. 5-10, 2001 (11 pages).
Borg, A. et al.; "Fault Tolerance Under UNIX"; ACM Transactions on Computer Systems, vol. 7, No. 1, Feb. 1989, pp. 1-24 (24 pages).
Rosenblum, M. et al.; "The Design and Implementation of a Log-Structured File System"; Electrical Engineering and Computer Sciences, Computer Science Division, Univeristy of California, 1991 (15 pages).
Hecht, M. S. et al.; "Shadowed Management of Free Disk Pages with a Linked List"; ACM Transactions on Database Systems, vol. 8, No. 4, Dec. 1983, pp. 503-514 (12 pages).
Rosenblum, M. et al.; "The LFS Storage Manager" Computer Science Division, Electrical Engineering and Computer Sciences, University of California; presented at the Summer '90 USENIX Technical Conference, Anaheim, California, Jun. 1990 (16 pages).
Lorie, R. A.; "Physical Integrity in a Large Segmented Database"; ACM Transactions on Database Systems, vol. 2, No. 1, Mar. 1977, pp. 91-104 (14 pages).
Johnson, J. E. et al.; "Overview of the Spiralog File System", Digital Technical Journal, vol. 8, No. 2, 1996, pp. 5-14 (10 pages).
Santry, D. S. et al.; "Deciding When to Forget in the Elephant File System"; 17th ACM Symposium on Operating Systems Principles (SOSP '99), Dec. 1999; pp. 110-123 (14 pages).
Chutani, S. et al., "The Episode File System"; Proceedings of the 1992 USENIX Winter Technical Conference; 1992; (18 pages).
Seltzer, M.L.; "File System Performance and Transaction Support"; University of California at Berkeley, 1992 (131 pages).
Austin, B. "A Dynamic Disc Allocation Algorithm Designed to Reduce Fragmentation During Filing Reloading", Information Sciences Laboratory, Corporate Research and Development Center, General Electric Company, 4 pages, 1970.
Goodheart, B., Cox, J. "The Magic Garden Explained", Prentice Hall, 8 pages, 1994.
Stallings, W. "Computer Organization and Architecture: Designing for Performance", Prentice Hall, 4 pages, 2000.
Goodheart, B., Cox, J., "The Magic Garden Explained", Prentice Hall, pp. 24-25, 29-30, 390-391, 1994.
Austin, B.J., "A Dynamic Disc Allocation Algorithm Designed to Reduce Fragmentation During File Relocating", pp. 378-381. 1970.
Stallings, W. "Computer Organization and Architecture: Designing for Performance", Prentice Hall, pp. 377-378, 2000.

* cited by examiner

METHOD AND SYSTEM FOR PRIORITY-BASED ALLOCATION IN A STORAGE POOL

CROSS-REFERENCE TO RELATED APPLICATIONS

The present application contains subject matter that may be related to the subject matter in the following U.S. patent applications, which are all assigned to a common assignee: "Method and Apparatus for Self-Validating Checksums in a File System" (application Ser. No. 10/828,573) filed on Apr. 24, 2004; "Method and Apparatus for Dynamic Striping" (application Ser. No. 10/828,677) filed on Apr. 21, 2004; "Method and Apparatus for Vectored Block-Level Checksum for File System Data Integrity" (application Ser. No. 10/828,715) filed on Apr. 21, 2004; "Method and Apparatus for Identifying Tampering of Data in a File System" (application Ser. No. 10/853,874) filed on May 26, 2004; "Method and System for Detecting and Correcting Data Errors Using Checksums and Replication" (application Ser. No. 10/853,837) filed on May 26, 2004; "Method and System for Detecting and Correcting Data Errors Using Data Permutations" (application Ser. No. 10/853,870) filed on May 26, 2004; "Method and Apparatus for Compressing Data in a File System" (application Ser. No. 10/853,868) filed on May 26, 2004; "Automatic Conversion of All-Zero Data Storage Blocks into File Holes" (application Ser. No. 10/853,915) filed on May 26, 2004; "Gang Blocks" (application Ser. No. 10/919,878) filed on Aug. 17, 2004; "Method and Apparatus for Enabling Adaptive Endianness" (application Ser. No. 10/919,886) filed on Aug. 17, 2004; "Method and System for Data Replication" (application Ser. No. 11/434,296) filed on May 15, 2006; "Multiple Replication Levels with Pooled Devices" (application Ser. No. 11/406,956) filed on Apr. 19, 2006; "Method and System for Per-File and Per-Block Replication" (application Ser. No. 11/406,850) filed on Apr. 19, 2006; "Method and System for Dirty Time Logging" (application Ser. No. 11/407,773) filed on Apr. 19, 2006; "Method and System for Dirty Time Log Directed Resilvering" (application Ser. No. 11/407,744) filed on Apr. 19, 2006; "Method and System for Metadata-Based Resilvering" (application Ser. No. 11/407,719) filed on Apr. 19, 2006; "Method and System for Pruned Resilvering Using a Dirty Time Log" (application Ser. No. 11/409,427) filed on Apr. 19, 2006; "Method and System Using Checksums to Repair Data" (application Ser. No. 11/406,756) filed on Apr. 19, 2006; "Method and System for Repairing Partially Damaged Blocks" (application Ser. No. 11/406,578) filed on Apr. 19, 2006; "Method and System for Storing a Sparse File Using Fill Counts" (application Ser. No. 11/406,592) filed on Apr. 19, 2006; "Method and System for Object Allocation Using Fill Counts" (application Ser. No. 11/408,134) filed on Apr. 20, 2006; "Ditto Blocks" (application Ser. No. 11/406,590) filed on Apr. 19, 2006; "Method and System for Adaptive Metadata Replication" (application Ser. No. 11/406,957) filed on Apr. 19, 2006; "Method and System for Block Reallocation" (application Ser. No. 11/409,435) filed on Apr. 19, 2006; "Method and System for Using a Block Allocation Policy" (application Ser. No. 11/407,637) filed on Apr. 20, 2006; "Block-Based Incremental Backup" (application Ser. No. 11/432,067) filed on May 11, 2006; "Unlimited File System Snapshots and Clones" (application Ser. No. 11/513,800) filed on Aug. 31, 2006; "Reflecting Bandwidth and Priority in Network Attached Storage I/O" (application Ser. No. 11/489,936) filed on Jul. 20, 2006; "Method and System for Power-Managing Storage Devices in a Storage Pool" application Ser. No. 11/591,234) filed on Oct. 31, 2006; and "Method and System for Reallocating Blocks in a Storage Pool" application Ser. No. 11/591,422) filed on Oct. 31, 2006.

BACKGROUND

A typical operating system includes a file system. The file system provides a mechanism for the storage and retrieval of files and a hierarchical directory structure for the naming of multiple files. More specifically, the file system stores information provided by a user (i.e., data) and information describing the characteristics of the data (i.e., metadata). The file system also provides extensive programming interfaces to enable the creation and deletion of files, reading and writing of files, performing seeks within a file, creating and deleting directories, managing directory contents, etc. In addition, the file system also provides management interfaces to create and delete file systems. File systems are typically controlled and restricted by operating system parameters. For example, most operating systems limit the maximum number of file names that can be handled within their file system. Some operating systems also limit the size of files that can be managed under a file system.

An application, which may reside on the local system (i.e., computer) or may be located on a remote system, uses files as an abstraction to address data. Conventionally, this data is stored on a storage device, such as a disk.

To access a file, the operating system (via the file system) typically provides file manipulation interfaces to open, close, read, and write the data within each file. More specifically, the file system stores data on the storage device by managing the allocation of space within the storage device. Typically, the volume manager provides space which is managed by the file system. Two common types of file system space allocation strategies are known as block-based allocation and extent-based allocation. Block-based allocation creates incremental disk space for each file each time the file is extended (i.e., modified via a write request to add information), whereas extent-based allocation creates a large series of contiguous blocks (i.e., extents) each time the file exhausts the space available in the file's last extent.

When allocating space, both block-based and extent-based allocation use space provided by the volume manager. The volume manager allows multiple physical disks to be used as a single volume (i.e., a virtual disk) to provide larger consolidated storage sizes and simpler management. The volume manager allows users to organize data along volume boundaries (i.e., each volume has physical disk space allocated to the volume such that the volume is tied only to that dedicated physical disk). The volume manager is typically implemented as a separate layer between the physical disks and the file system, and is presented to the user as a virtual disk device. In other words, volume managers organize the collections of physical devices (e.g., disks) into virtual devices. Additionally, the space allocated within the volume manager is handled by the file system. Consequently, the volume manager is not aware of which blocks within the available storage space are in use and which blocks are free for data to be stored.

Further, file systems may be mounted on the virtual disk devices. Thus, physical disks are partitioned and allocated to multiple virtual disk devices, and each virtual disk device is capable of having a file system that exclusively uses that particular virtual disk device. A request to access a file is typically performed by an application, via the file system, using a file name and logical offset. This file name and logical offset (i.e., the manner in which applications express file operation requests) corresponds to a location within the virtual disk device. Subsequently, the request is translated to physical disk space on the storage device by the volume manager, allowing the user of the application to access the data within a particular file.

Typically, to add a disk to a volume, all data stored on the volume is backed up to an alternate location (i.e., another volume or any other alternate storage device outside of the volume). The volume is then destroyed and subsequently recreated with the new disk. Finally, the backed up data is transferred back onto the recreated volume. To avoid the need to recreate a volume when a disk is added to the volume, volumes are frequently over-provisioned. That is, a volume may be created using more disks than are initially needed. Thus, the disks are always available for use in the volume, whether or not the storage capacity of the disks is actually needed.

SUMMARY

In general, in one aspect, the invention relates to a method for priority-based allocation in a storage pool. The method comprises receiving a first request to write a first data item in the storage pool, wherein the storage pool comprises a plurality of metaslabs, and wherein each of the plurality of metaslabs comprises a contiguous region of data, determining a first target metaslab selected from the plurality of metaslabs by comparing a first plurality of allocation priorities, wherein each of the first plurality of allocation priorities is associated with one of the plurality of metaslabs, allocating a first block to the first target metaslab, and writing the first block to the first target metaslab, wherein the first block comprises a first portion of the first data item.

In general, in one aspect, the invention relates to a system. The system comprises a storage pool comprising a plurality of metaslabs, wherein each of the plurality of metaslabs comprises a contiguous region of data, a plurality of allocation priorities, wherein each of the plurality of allocation priorities is associated with one of the plurality of metaslabs, and a file system configured to receive a request to write a data item in the storage pool, determine a target metaslab selected from the plurality of metaslabs by comparing the plurality of allocation priorities, allocate a block to the target metaslab, and write the block to the target metaslab, wherein the block comprises a portion of the data item.

In general, in one aspect, the invention relates to a computer readable medium. The computer readable medium comprises executable instructions for priority-based allocation in a storage pool by receiving a first request to write a first data item in the storage pool, wherein the storage pool comprises a plurality of metaslabs, and wherein each of the plurality of metaslabs comprises a contiguous region of data, determining a first target metaslab selected from the plurality of metaslabs by comparing a first plurality of allocation priorities, wherein each of the first plurality of allocation priorities is associated with one of the plurality of metaslabs, allocating a first block to the first target metaslab, and writing the first block to the first target metaslab, wherein the first block comprises a first portion of the first data item.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a Method And System For Priority-Based Allocation In A Storage Pool. Specifically, in one or more embodiments of the invention, metaslabs in the storage pool are associated with allocation priorities. Further, in one or more embodiments of the invention, when a request to write a data item to the storage pool is received, a block is allocated in a target metaslab (i.e., one of the metaslabs in the storage pool), and at least a portion of the data item is written to the block. Specifically, in one or more embodiments of the invention, the target metaslab is determined by comparing the allocation priorities associated with at least one of the plurality of metaslabs.

Figure 1:
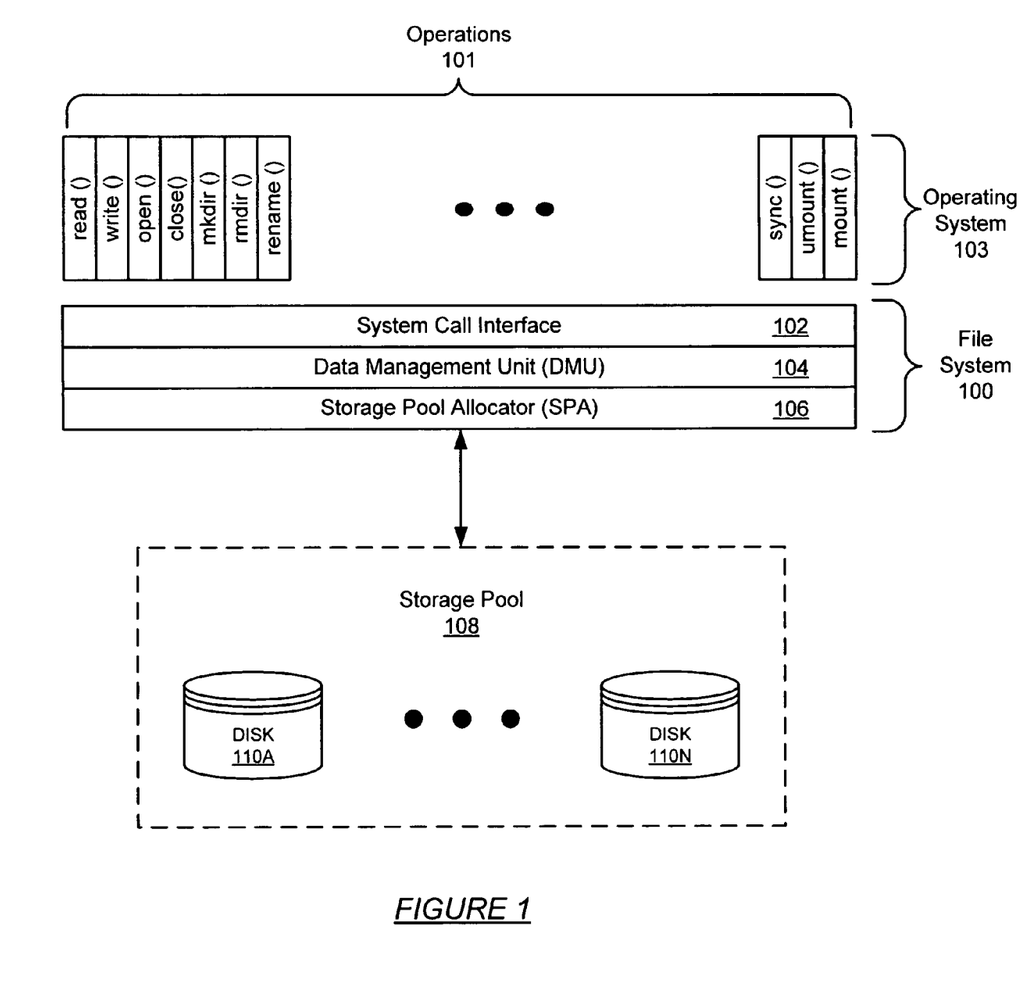
FIG. 1 shows a diagram of a system architecture in accordance with one embodiment of the invention.

FIG. 1 shows a system architecture in accordance with one embodiment of the invention. The system architecture includes an operating system (103) interacting with a file system (100), which in turn interfaces with a storage pool (108). In one embodiment of the invention, the file system (100) includes a system call interface (102), a data management unit (DMU) (104), and a storage pool allocator (SPA) (106).

The operating system (103) typically interfaces with the file system (100) via a system call interface (102). The operating system (103) provides operations (101) for users to access files within the file system (100). These operations (101) may include read, write, open, close, etc. In one embodiment of the invention, the file system (100) is an object-based file system (i.e., both data and metadata are stored as objects). More specifically, the file system (100) includes functionality to store both data and corresponding metadata in the storage pool (108). Thus, the aforementioned operations (101) provided by the operating system (103) correspond to operations on objects.

More specifically, in one embodiment of the invention, a request to perform a particular operation (101) (i.e., a transaction) is forwarded from the operating system (103), via the system call interface (102), to the DMU (104). In one embodiment of the invention, the DMU (104) translates the request to perform an operation on an object directly to a request to perform a read or write operation at a physical location within the storage pool (108). More specifically, the DMU (104) represents the objects as data blocks and indirect blocks as described in FIG. 3 below. Additionally, in one embodiment of the invention, the DMU (104) includes functionality to group related work (i.e., modifications to data blocks and indirect blocks) into I/O requests allowing related blocks to be forwarded to the SPA (106) together. The SPA (106) receives transactions from the DMU (106) and subsequently writes the blocks into the storage pool (108). The operation of the SPA (106) is described in FIG. 2 below.

In one embodiment of the invention, the storage pool (108) includes one or more physical disks (disks (110A-110N)). Further, in one embodiment of the invention, the storage capacity of the storage pool (108) may increase and decrease dynamically as physical disks are added and removed from the storage pool. In one embodiment of the invention, the storage space available in the storage pool (108) is managed by the SPA (106).

Figure 2:
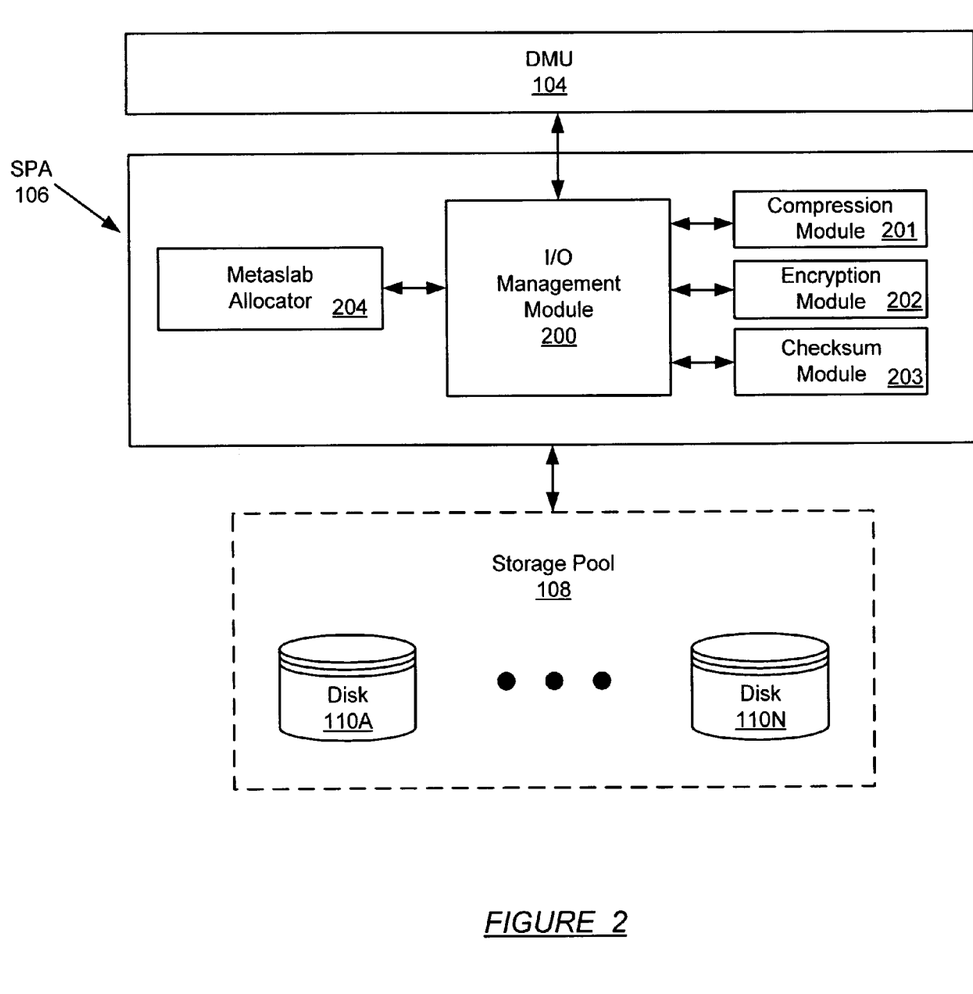
FIG. 2 shows a diagram of a storage pool allocator in accordance with one embodiment of the invention.

FIG. 2 shows the SPA (106) in accordance with one embodiment of the invention. The SPA (106) may include an I/O management module (200), a compression module (201), an encryption module (202), a checksum module (203), and a metaslab allocator (204). Each of these aforementioned modules in detail below.

As noted above, the SPA (106) receives transactions from the DMU (104). More specifically, the I/O management module (200), within the SPA (106), receives transactions from the DMU (104) and groups the transactions into transaction groups in accordance with one embodiment of the invention. The compression module (201) provides functionality to compress larger logical blocks (i.e., data blocks and indirect blocks) into smaller segments, where a segment is a region of physical disk space. For example, a logical block size of 8 K bytes may be compressed to a size of 2 K bytes for efficient storage. Further, in one embodiment of the invention, the encryption module (202) provides various data encryption algorithms. The data encryption algorithms may be used, for example, to prevent unauthorized access. In one embodiment of the invention, the checksum module (203) includes functionality to calculate a checksum for data (i.e., data stored in a data block) and metadata (i.e., data stored in an indirect block) within the storage pool. The checksum may be used, for example, to ensure data has not been corrupted.

As discussed above, the SPA (106) provides an interface to the storage pool and manages allocation of storage space within the storage pool (108). More specifically, in one embodiment of the invention, the SPA (106) uses the metaslab allocator (204) to manage the allocation of storage space in the storage pool (108).

In one embodiment of the invention, the storage space in the storage pool is divided into contiguous regions of data, i.e., metaslabs. The metaslabs may in turn be divided into segments (i.e., portions of the metaslab). The segments may all be the same size, or alternatively, may be a range of sizes. The metaslab allocator (204) includes functionality to allocate large or small segments to store data blocks and indirect blocks. In one embodiment of the invention, allocation of the segments within the metaslabs is based on the size of the blocks within the I/O requests. That is, small segments are allocated for small blocks, while large segments are allocated for large blocks. The allocation of segments based on the size of the blocks may allow for more efficient storage of data and metadata in the storage pool by reducing the amount of unused space within a given metaslab. Further, using large segments for large blocks may allow for more efficient access to data (and metadata) by reducing the number of DMU (104) translations and/or reducing the number of I/O operations. In one embodiment of the invention, the metaslab allocator may include a policy that specifies a method to allocate segments.

Figure 3:
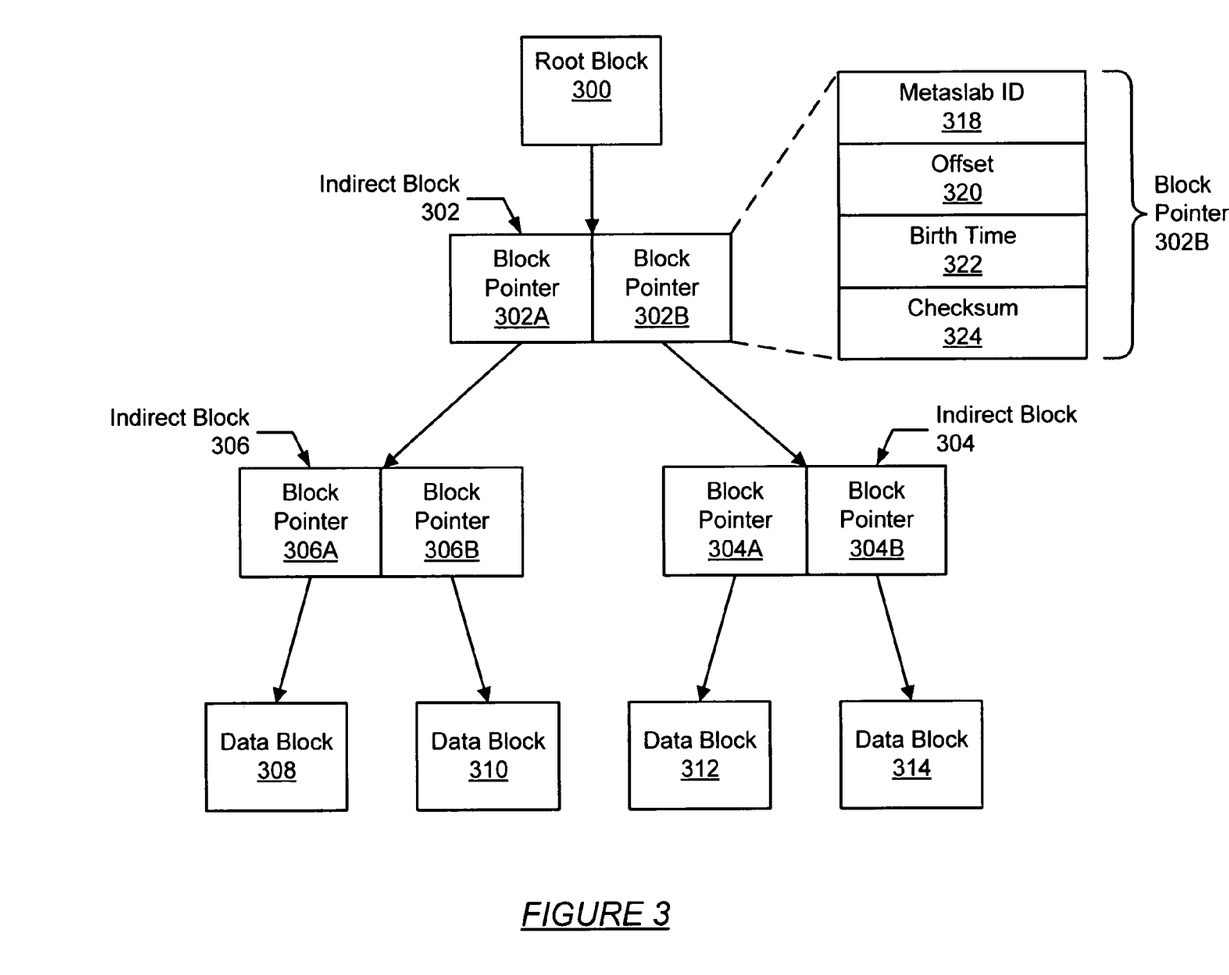
FIG. 3 shows a diagram of a hierarchical data configuration in accordance with one embodiment of the invention.

As noted above, the storage pool (108) is divided into metaslabs, which are further divided into segments. Each of the segments within the metaslab may then be used to store a data block (i.e., data) or an indirect block (i.e., metadata). FIG. 3 shows the hierarchical data configuration (hereinafter referred to as a "tree") for storing data blocks and indirect blocks within the storage pool in accordance with one embodiment of the invention. In one embodiment of the invention, the tree includes a root block (300), one or more levels of indirect blocks (302, 304, 306), and one or more data blocks (308, 310, 312, 314). In one embodiment of the invention, the location of the root block (300) is in a particular location within the storage pool. The root block (300) typically points to subsequent indirect blocks (302, 304, and 306).

In one embodiment of the invention, indirect blocks (302, 304, and 306) may be arrays of block pointers (e.g., 302A, 302B, etc.) that, directly or indirectly, reference to data blocks (308, 310, 312, and 314). The data blocks (308, 310, 312, and 314) contain actual data of files stored in the storage pool. One skilled in the art will appreciate that several layers of indirect blocks may exist between the root block (300) and the data blocks (308, 310, 312, 314).

In contrast to the root block (300), indirect blocks and data blocks may be located anywhere in the storage pool (108 in FIG. 1). In one embodiment of the invention, the root block (300) and each block pointer (e.g., 302A, 302B, etc.) includes data as shown in the expanded block pointer (302B). One skilled in the art will appreciate that data blocks do not include this information; rather, data blocks contain actual data of files within the file system.

In one embodiment of the invention, each block pointer includes a metaslab ID (318), an offset (320) within the metaslab, a birth value (322) of the block referenced by the block pointer, and a checksum (324) of the data stored in the block (data block or indirect block) referenced by the block pointer. In one embodiment of the invention, the metaslab ID (318) and offset (320) are used to determine the location of the block (data block or indirect block) in the storage pool. The metaslab ID (318) identifies a particular metaslab. More specifically, the metaslab ID (318) may identify the particular disk (within the storage pool) upon which the metaslab resides and where in the disk the metaslab begins. The offset (320) may then be used to reference a particular segment in the metaslab. In one embodiment of the invention, the data within the segment referenced by the particular metaslab ID (318) and offset (320) may correspond to either a data block or an indirect block. If the data corresponds to an indirect block, then the metaslab ID and offset within a block pointer in the indirect block are extracted and used to locate a subsequent data block or indirect block. The tree may be traversed in this manner to eventually retrieve a requested data block.

In one embodiment of the invention, copy-on-write transactions are performed for every data write request to a file. Specifically, all write requests cause new segments to be allocated for the modified data. Therefore, the retrieved data blocks and indirect blocks are never overwritten (until a modified version of the data block and indirect block is committed). More specifically, the DMU writes out all the modified data blocks in the tree to unused segments within the storage pool. Subsequently, the DMU writes out the corresponding block pointers (within indirect blocks) to unused segments in the storage pool. In one embodiment of the invention, fields (i.e., metaslab ID, offset, birth, checksum) for the corresponding block pointers are populated by the DMU prior to sending an I/O request to the SPA. The indirect blocks containing the block pointers are typically written one level at a time. To complete the copy-on-write transaction, the SPA issues a single write that atomically changes the root block to reference the indirect blocks referencing the modified data block.

Figure 4:
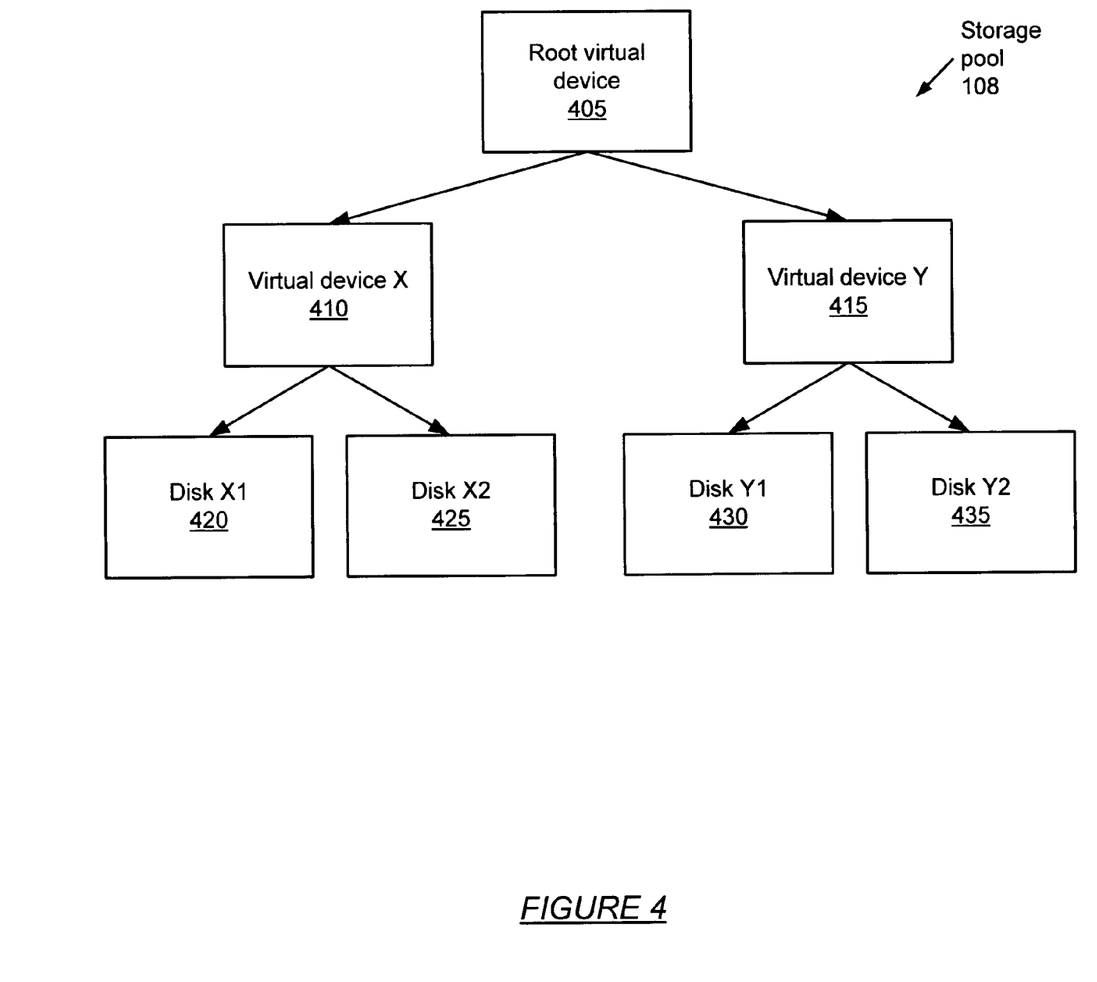
FIG. 4 shows a diagram of a storage pool in accordance with one embodiment of the invention.

FIG. 4 shows a diagram of a storage pool (108) in accordance with one embodiment of the invention. As noted above, a storage pool includes one or more physical disks (e.g., disk X1 (420), disk X2 (425), disk Y1 (430), disk Y2 (435)). Further, disks in the storage pool may be grouped into virtual devices. Specifically, virtual devices provide a logical layer of abstraction over underlying physical disks. A process accessing a virtual device typically views the virtual device as a single storage device. That is, the process is not aware of the underlying arrangement of physical disks.

For example, in FIG. 4, disk X1 (420) and disk X2 (425) are grouped into virtual device X (410). Similarly, disk Y1 (430) and disk Y2 (435) are grouped into virtual device Y (415). While FIG. 4 shows two virtual devices (410, 415) each having two underlying physical disks (420, 425 and 430, 435), any other arrangement of virtual devices and/or physical disks may be used. For example, the storage system (108) may include only a single virtual device. Further, a virtual device may have only one underlying physical disk. In one embodiment of the invention, the physical disk(s) themselves are also treated as a class of virtual devices within the file system.

In one embodiment of the invention, virtual devices are configured in a virtual device tree. Accordingly, the storage pool (108) may include a root virtual device (405) acting as a root of the virtual device tree. While the root virtual device (405) illustrated in FIG. 4 has only two immediate children (i.e., virtual device X (410) and virtual device Y (415)), the root virtual device (405) may have any other number of children, as permitted by the file system. Further, the virtual device tree may include any number of levels of virtual devices, and the tree may not be balanced. That is, one branch of the tree may have more levels than another branch, and/or may include more virtual devices than another branch.

Figure 5:
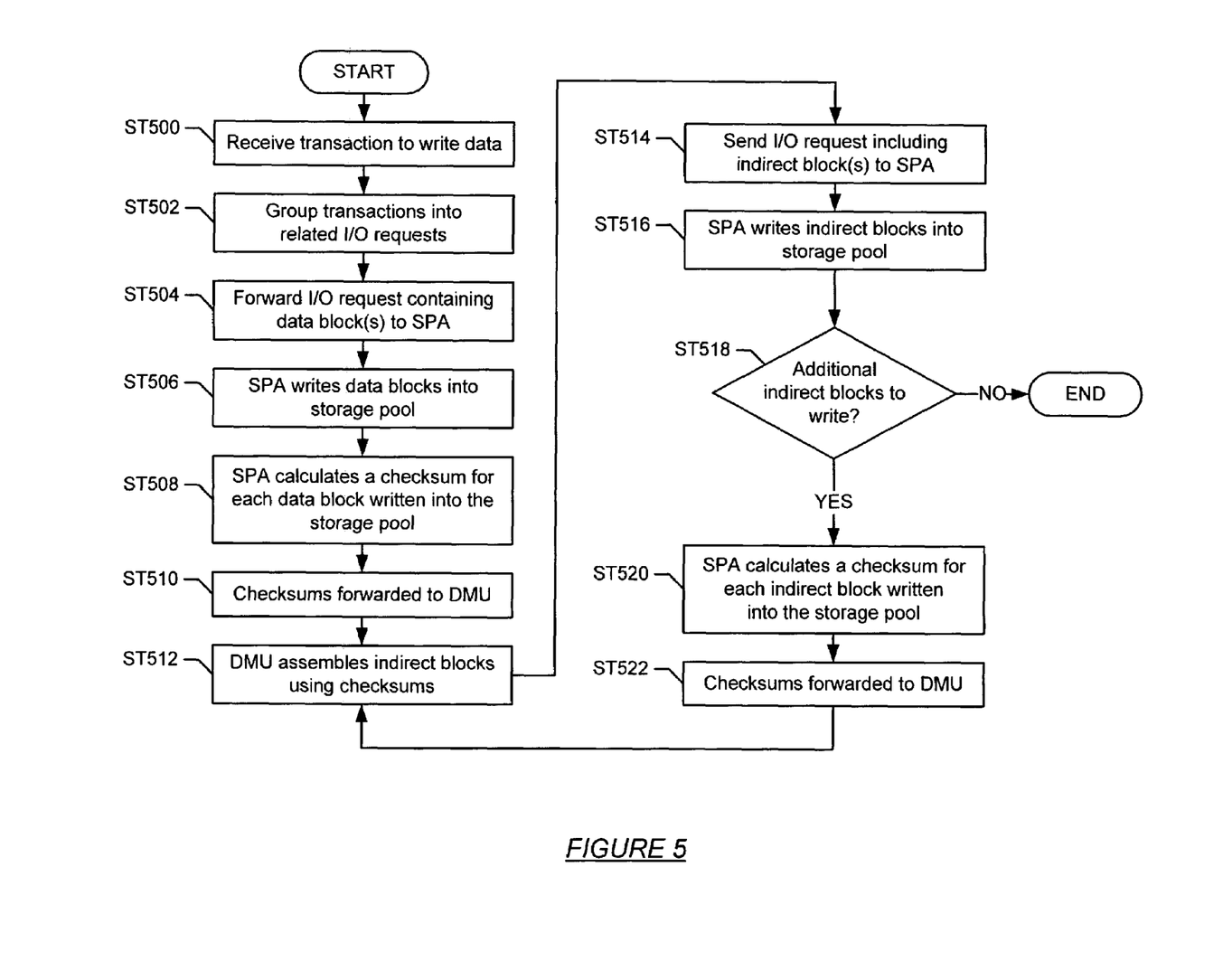
FIGS. 5-6 show flow charts in accordance with one embodiment of the invention.

Using the infrastructure described above in relation to FIGS. 1-4, the following discussion describes a method for writing data to a storage pool in accordance with one embodiment of the invention. FIG. 5 shows a flow chart in accordance with one embodiment of the invention. In one embodiment of the invention, one or more of the steps discussed below may be omitted, repeated, and/or performed in a different order than the order shown in FIG. 5. Accordingly, the specific arrangement of steps shown in FIG. 5 should not be construed as limiting the scope of the invention.

Initially, the DMU receives a transaction from an application, the operating system (or a subsystem therein), etc. (ST 500). The DMU subsequently groups the transaction into one or more I/O requests (ST 502). The I/O requests are subsequently forwarded to the SPA (ST 504).

In one embodiment of the invention, the transaction includes one or more data blocks, and/or one or more indirect blocks. As noted above, the file system is stored on disk using a hierarchical structure including data blocks and indirect blocks. Thus, for a given set of transactions, the first I/O request includes the data blocks to be written to disk, while subsequent I/O requests include the corresponding indirect blocks containing one or more block pointers. Accordingly, I/O request referenced in ST 504 includes data blocks.

Continuing with the discussion of FIG. 5, the SPA, upon receiving the I/O request including data blocks from the DMU, writes the data blocks into the storage pool (ST 506).

The SPA subsequently calculates a checksum for each data block written into the storage pool (ST 508). In one embodiment, the checksum module (203 in FIG. 2) within the SPA is used to calculate the checksum for each data block written into the storage pool. The checksums are subsequently forwarded to the DMU (ST 510). The DMU then assembles the indirect blocks using the checksums (ST 512). Specifically, the DMU places the checksum for a given data block in the appropriate block pointer within the indirect block (i.e., the parent indirect block of the data block). Next, the indirect blocks are forwarded to the SPA (ST 514). Those skilled in the art will appreciate that the aforementioned indirect blocks correspond to the indirect blocks that directly point (via the block pointers) to the data blocks (as opposed to indirect blocks that point to other indirect blocks).

Next, the SPA receives and subsequently writes the indirect blocks into the storage pool (ST 516). A determination is then made about whether additional indirect blocks exist to write into the storage pool (i.e., whether the last indirect block written to the storage pool corresponds to the root block) (ST 518). If no additional indirect blocks exist, then the method is complete. However, if additional indirect blocks exist, then the SPA calculates the checksum from each of the indirect blocks written into the storage pool (ST 520). The checksums for each of the indirect blocks is subsequently forwarded to the DMU (ST 522). Steps ST 512 through ST 522 are subsequently repeated until the root block is written into the storage pool.

Figure 6:
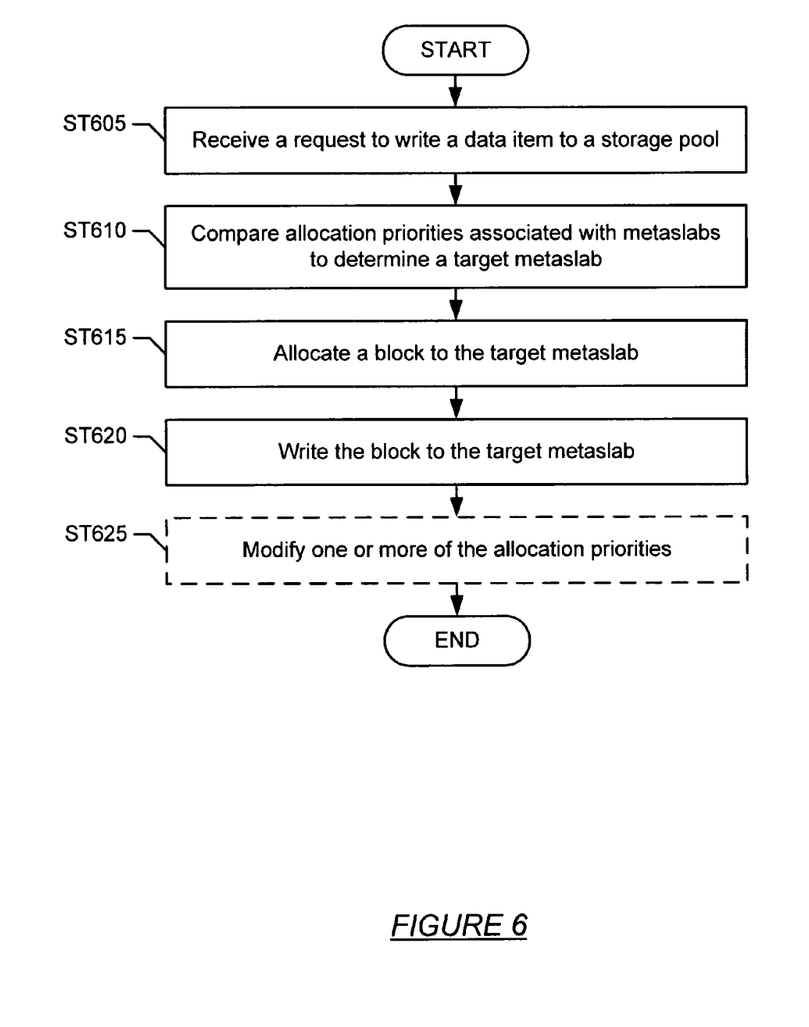

Building on the discussion of FIG. 5, FIG. 6 shows a flow chart in accordance with one embodiment of the invention. Specifically, FIG. 6 shows a flow chart of a method for writing data to a storage pool in accordance with one embodiment of the invention. In one embodiment of the invention, one or more of the steps described below may be omitted, repeated, and/or performed in a different order. Accordingly, the specific arrangement of steps shown in FIG. 6 should not be construed as limiting the scope of the invention.

Initially, a request to write a data item to the storage pool is received (ST 605). For example, ST 605 may correspond to ST 500 of FIG. 5. More specifically, in one embodiment of the invention, the data item is a unit of data that may be written to the storage pool as one or more data blocks and/or indirect blocks, as discussed above.

In one embodiment of the invention, to write a block of the data item (e.g., ST 506 and/or ST 516 of FIG. 5), a location in the storage pool to write the block to is selected. Specifically, as noted above, the storage pool may be divided into metaslabs. In one embodiment of the invention, a target metaslab to which to write the block is determined by comparing allocation priorities associated with the metaslabs (ST 610). Specifically, in one embodiment of the invention, each metaslab may be associated with an allocation priority, and the target metaslab may be the metaslab having the highest allocation priority. If two or more metaslabs have identical allocation priorities, and each of the identical allocation priorities corresponds to the highest allocation priority, the metaslab to use as the target metaslab may be determined by randomly selecting one of the metaslabs that have identical allocation priorities. Alternatively, block writes may be alternated between the metaslabs that have identical allocation priorities. In one embodiment of the invention, the allocation priorities are numbers, characters, bit fields, bit arrays, any other similar type of value, or any combination thereof.

In one embodiment of the invention, allocation priorities for metaslabs may be user-assigned. Alternatively, the allocation priorities may be associated with one or more block allocation policies. Specifically, each block allocation policy may define criteria for assigning and/or modifying allocation priorities to achieve an optimization goal for the storage pool. In one embodiment of the invention, the metaslab with the highest allocation priority is the metaslab (i.e., of the available metaslabs) assumed to best meet the optimization goal. Further, in one embodiment of the invention, the allocation priorities may be initially user-assigned, and may be subsequently modified according to a block allocation policy. Modification of allocation priorities is discussed in detail below.

For example, a block allocation policy may be designed according to an optimization goal of increasing a data transfer rate associated with the storage pool, i.e., rates of data transfer to and/or from one or more storage devices in the storage pool. In one embodiment of the invention, increasing a data transfer rate associated with the storage pool may involve assigning higher allocation priorities to metaslabs that are faster to access. For example, metaslabs located near the outer edge of a hard disk platter are typically faster to access than metaslabs located near the inner edge of a hard disk platter. Accordingly, outer metaslabs may be assigned higher allocation priorities than inner metaslabs. Allocation priorities may alternatively be based on access latencies, seek times, platter speeds, any other similar type of performance characteristic, or any combination thereof.

As another example, a block allocation policy may be designed according to an optimization goal of reducing power consumption associated with the storage pool. For example, metaslabs on storage devices that consume less power may be assigned higher allocation priorities than metaslabs on storage devices that consume more power. In one embodiment of the invention, one or more storage devices with higher power consumption are powered down, and allocation priorities are used to determine when to power up the storage device(s). Those skilled in the art will appreciate that reducing power consumption associated with the storage pool may reduce the cost of operating the storage pool.

As discussed above, allocation priorities may be used to determine when to power up a storage device for use in the storage pool. More specifically, a storage pool may include one or more powered up storage devices, and one or more powered down storage devices. Allocation priorities for metaslabs on the powered down storage device(s) may initially be relatively low. As available storage capacity on the powered up storage device(s) decreases, allocation priorities for available metaslabs on the powered up storage device(s) may also decrease. Once the allocation priorities for the available metaslabs on the powered up storage device(s) satisfy a policy-defined threshold value, one or more of the powered down storage devices may be powered up and made available for use in the storage pool. For example, the storage device(s) may be powered up once their allocation priorities are comparable to the allocation priorities for the available metaslabs on the powered up storage device(s). Once a storage device is powered up, allocation priorities for metaslabs on the storage device may then be recalculated to reflect its powered up state. Further, the block allocation policy may include similar criteria for powering down storage devices.

Those skilled in the art will appreciate that powering up a storage device typically takes time. For example, spinning up a hard disk typically takes an amount of time on the order of seconds. Accordingly, a block allocation policy may be designed to power up a storage device before the storage device is actually needed for use in the storage pool, to avoid delays in accessing the storage device. Specifically, the lead time for powering up the storage device may be proportional to the amount of time required to power up the storage device. Said another way, the block allocation policy may effectively be predictive, i.e., initiate changes to the storage pool based on a predicted state of the storage pool. In one embodiment of the invention, other types of block allocation policies may also be predictive.

Further discussion of adding and removing storage devices from storage pools can be found in copending U.S. patent application Ser. No. 11/591,234, entitled "Method and System for Power-Managing Storage Devices in a Storage Pool," filed on Oct. 31, 2006, the entire contents of which are incorporated herein by reference, and U.S. patent application Ser. No. 11/591,422, entitled "Method and System for Reallocating Blocks in a Storage Pool," filed on Oct. 31, 2006, the entire contents of which are incorporated herein by reference. Both applications are in the names of the same inventors as the present application and assigned to a common assignee.

As another example, a block allocation policy may be designed according to an optimization goal of reducing a financial cost of maintaining the storage pool. Specifically, some storage devices are more costly to purchase and/or operate than others. For example, serial AT attachment (SATA) hard disks are typically less expensive to purchase than small computer system interface (SCSI) hard disks. Further, hard disks are known to have a limited lifespan due to eventual mechanical failure. Accordingly, to reduce the cost of replacing hard disks over time, an allocation policy may be designed to favor SATA hard disks over SCSI hard disks (i.e., by assigning higher allocation priorities to metaslabs on SATA hard disks than to metaslabs on SCSI hard disks). Alternatively, if the allocation policy is designed to increase a data transfer rate associated with the storage pool, SCSI hard disks may be favored over SATA hard disks.

In one embodiment of the invention, multiple block allocation policies may be in effect for the storage pool. Specifically, each metaslab may be associated with multiple allocation priorities, corresponding to different block allocation policies. Further, the particular block allocation policy used to service a request may depend on one or more characteristics of the software process making the request. For example, one block allocation policy may be used for kernel-level processes, and another block allocation policy may be used for user-land processes. As another example, two or more file systems may be using the same storage pool, and each file system may have different optimization goals. Accordingly, each file system may have its own set of allocation priorities.

Further, a request to write a data item to the storage pool may be accompanied by an allocation priority request. Specifically, the allocation priority request may indicate a block allocation policy to use when writing the data item to the storage pool. In other words, the allocation priority request may provide guidance for which set of allocation priorities to compare. More specifically, different types of software processes generally have different performance characteristics, and accordingly may request that a particular block allocation policy be used that is most appropriate for those performance characteristics.

For example, a software process that requires fast data access may request that the blocks be written according to a block allocation policy designed to increase data transfer rates. As another example, a data archiving process may request that the blocks be written according to a block allocation policy designed to minimize data fragmentation in the storage pool. In one embodiment of the invention, the allocation priority request is effective only if the software process issuing the request has sufficient privileges. For example, the use of allocation priority requests may be reserved for kernel-level processes, and allocation priority requests from userland processes may be ignored.

In view of the above discussion, those skilled in the art will appreciate that many different types of allocation priority requests may be issued, depending for example on the types of block allocation policies available and the types of software processes using the storage pool. Further, those skilled in the art will appreciate that the aforementioned block allocation policies are provided for exemplary purposes only, and that many different types of block allocation policies, or any combination thereof, may be used. Accordingly, the examples provided above should not be construed as limiting the scope of the invention.

Continuing with discussion of FIG. 6, in one embodiment of the invention, once a target metaslab is determined (i.e., ST 610), the block is allocated to the target metaslab (ST 615). That is, one or more data locations in the metaslab are reserved for the block. The block is subsequently written to the target metaslab (ST 620) at the allocated data location(s). As discussed above, the block that is written may be a data block or an indirect block. For example, ST 620 may correspond to ST 506 of FIG. 5 and/or ST 516 of FIG. 5.

As discussed above, in one embodiment of the invention, a set of allocation priorities is associated with a block allocation policy. Further, one or more of the allocation priorities may be modified according to the block allocation policy (ST 625). For example, an allocation priority associated with a particular metaslab may be decreased when a block is written to the metaslab. As another example, an allocation priority associated with a particular metaslab may be increased when a block is deleted from the metaslab. As another example, allocation priorities for metaslabs on a storage device may be increased or decreased if the power state of the storage device is changed. Further, in one embodiment of the invention, allocation priorities may be modified dynamically, e.g., during normal operation of the storage pool. For example, a storage pool allocator (SPA) (e.g., SPA (106) of FIG. 1) may be responsible for managing allocation priorities associated with metaslabs in the storage pool, as conditions in the storage pool change.

Further, in one embodiment of the invention, a hysteretic model may be used when modifying allocation priorities. For example, allocation priorities may be slower to decrease than to increase. Specifically, using a hysteretic model may help to avoid a scenario in which the relative allocation priorities of two metaslabs alternate frequently, thereby degrading performance of the storage pool. For example, a hysteretic model may be used to avoid frequently powering up and powering down the same storage device. Further, a hysteretic model may reduce data fragmentation in the storage pool.

In one embodiment of the invention, once a target metaslab is determined (i.e., ST 610), all blocks associated with the data item may be written to the same target metaslab. Alternatively (depending, for example, on the block allocation policy used), one or more blocks may be written to different metaslabs in the storage pool. Accordingly, ST 610 through ST 620 may be repeated for each block. Further, in one embodiment of the invention, allocation priorities are optionally modified (i.e., ST 625) between each block write. Alternatively, allocation priorities may be modified at regular time intervals, after a predetermined number of block writes, between data item write requests, when the power state of a storage device is changed, according to any other similar criteria, or any combination thereof.

FIGS. 7A-7D show diagrams of an example of writing data to a storage pool in accordance with one embodiment of the invention. Those skilled in the art will appreciate that FIGS. 7A-7D are provided for exemplary purposes only and accordingly should not be construed as limiting the scope of the invention in any way.

Figure 7A:
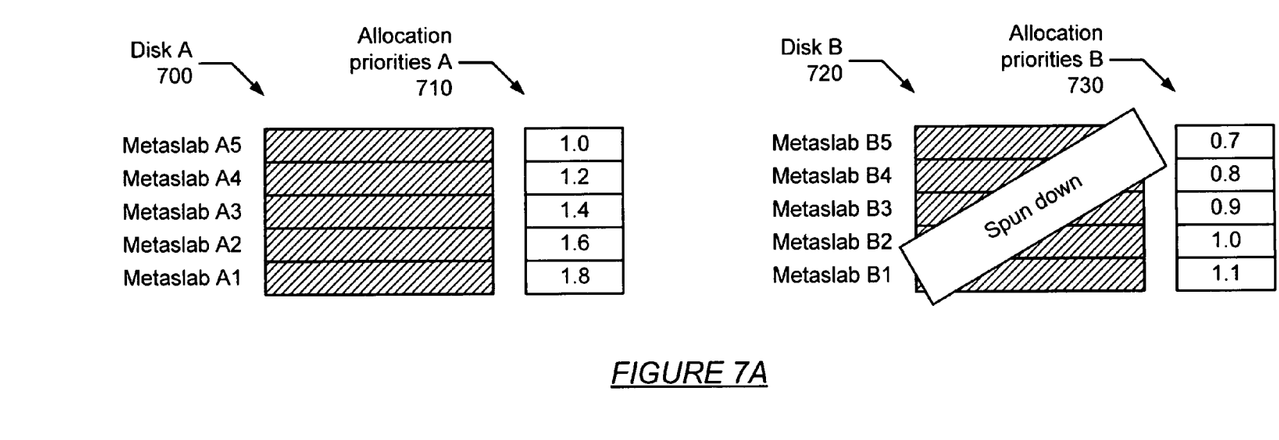
FIGS. 7A-7D show diagrams of an example of writing data to a storage pool in accordance with one embodiment of the invention.

As shown in FIG. 7A, a storage pool initially includes two disks (i.e., disk A (700) and disk B (720)). Disk A (700) is initially spun up, and disk B (720) is initially spun down. Each disk (700, 720) includes five metaslabs, i.e., A1, A2, A3, A4, A5 and B1, B2, B3, B4, B5. Further, each disk (700, 720) is associated with a set of allocation priorities (i.e., allocation priorities A (710) and allocation priorities B (730)) corresponding to the metaslabs.

For the purposes of this example, an allocation policy for the storage pool is designed to maximize data transfer rates. Further, the lower-numbered metaslabs are assumed to be closest to the outer edges of the disks (700, 720). Accordingly, the lower-numbered metaslabs are assigned higher allocation priorities. Further, because disk B (720) is spun down, allocation priorities B (730) are lower than allocation priorities A (710).

Figure 7B:
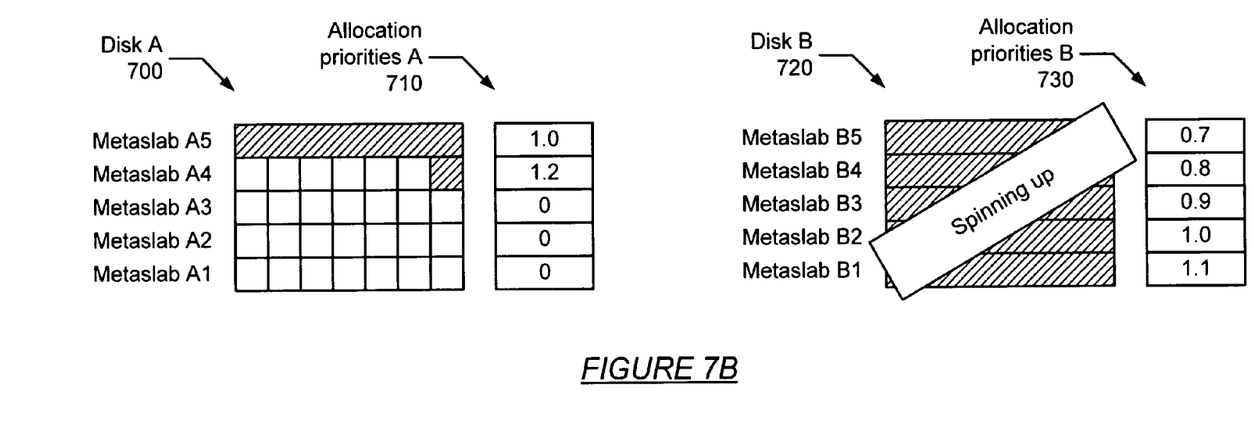

In FIG. 7A, no data has been written to either disk (700, 720). In FIG. 7B, blocks have been written to disk A (700), starting at metaslab A1 and moving inward on the disk. As metaslabs are filled, their allocation priorities are set to zero, to reflect that they are no longer available to write to. Further, in this example, the allocation policy used is predictive. Specifically, in FIG. 7B, metaslab A4 is nearly full, and the allocation priority for metaslab B1 is higher than the allocation priority for metaslab A5. Accordingly, in anticipation of metaslab B1 being selected as a target metaslab, disk B (720) is being spun up.

Figure 7C:
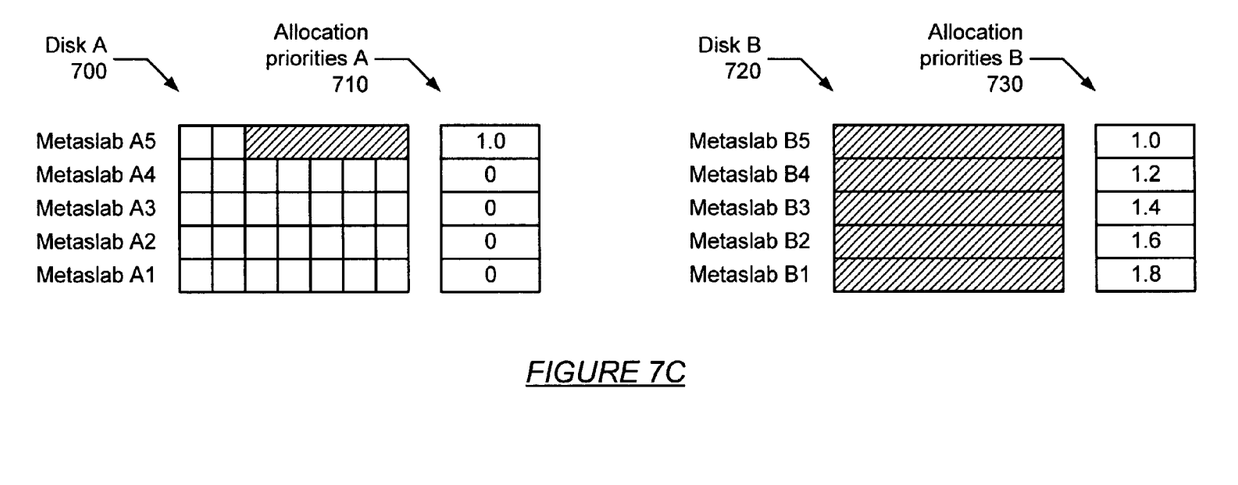

In FIG. 7C, disk B (720) is fully spun up. Further, allocation priorities B (730) have been modified to reflect that disk B (730) is spun up. Further, while disk B (720) was spinning up, more blocks were written to metaslabs A4 and A5. At this point, metaslab B1 is available to write to, and has the highest allocation priority of all the available metaslabs.

Figure 7D:
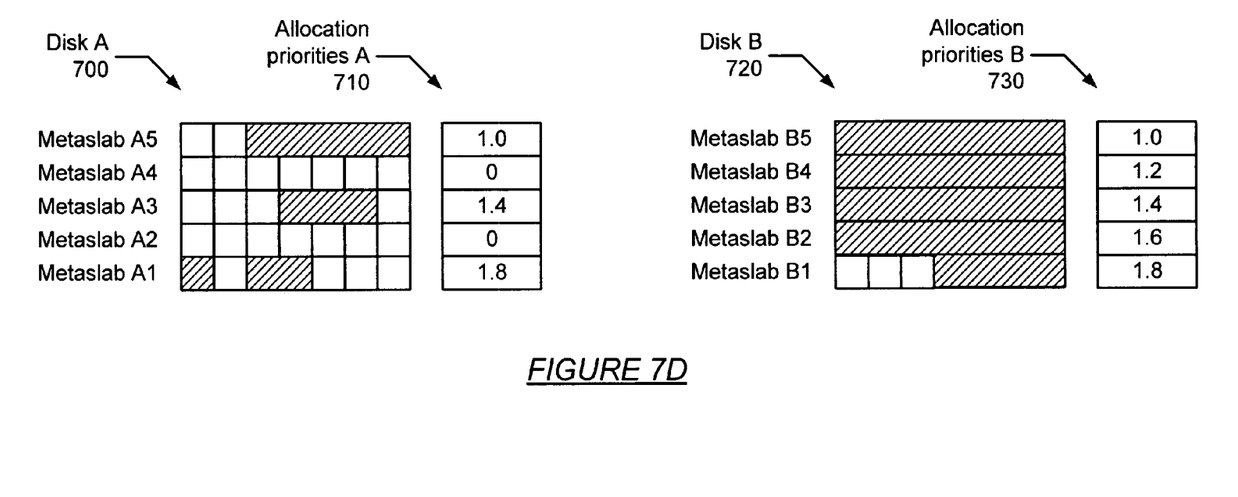

FIG. 7D shows the storage pool after several blocks have been written to metaslab B1. Further, after the blocks were written, other blocks were removed from disk A (700), on metaslabs A1 and A3. Accordingly, the allocation priorities for metaslabs A1 and A3 have been increased to reflect that the metaslabs are once again available to write to. In this state, metaslabs A1 and B1 will be favored for the next write request, followed by metaslab B2, metaslabs A3 and B3, metaslab B4, and finally metaslabs A5 and B5. In this manner, blocks are always written to the available metaslabs having the fastest access times, thereby increasing data transfer rates for the storage pool.

Further, in one embodiment of the invention, modifications of allocation priorities may be more fine-grained than shown in FIGS. 7A-7D. For example, still referring to FIGS. 7A-7D, after blocks are written to metaslab A5, the allocation priority for metaslab A5 may be decreased to 0.9 rather than remaining at 1.0. Accordingly, subsequent blocks are written to metaslab B5 before writing any additional blocks to metaslab A5. This type of fine-grained adjustment may allow for improved load-balancing across the storage pool.

Figure 8:
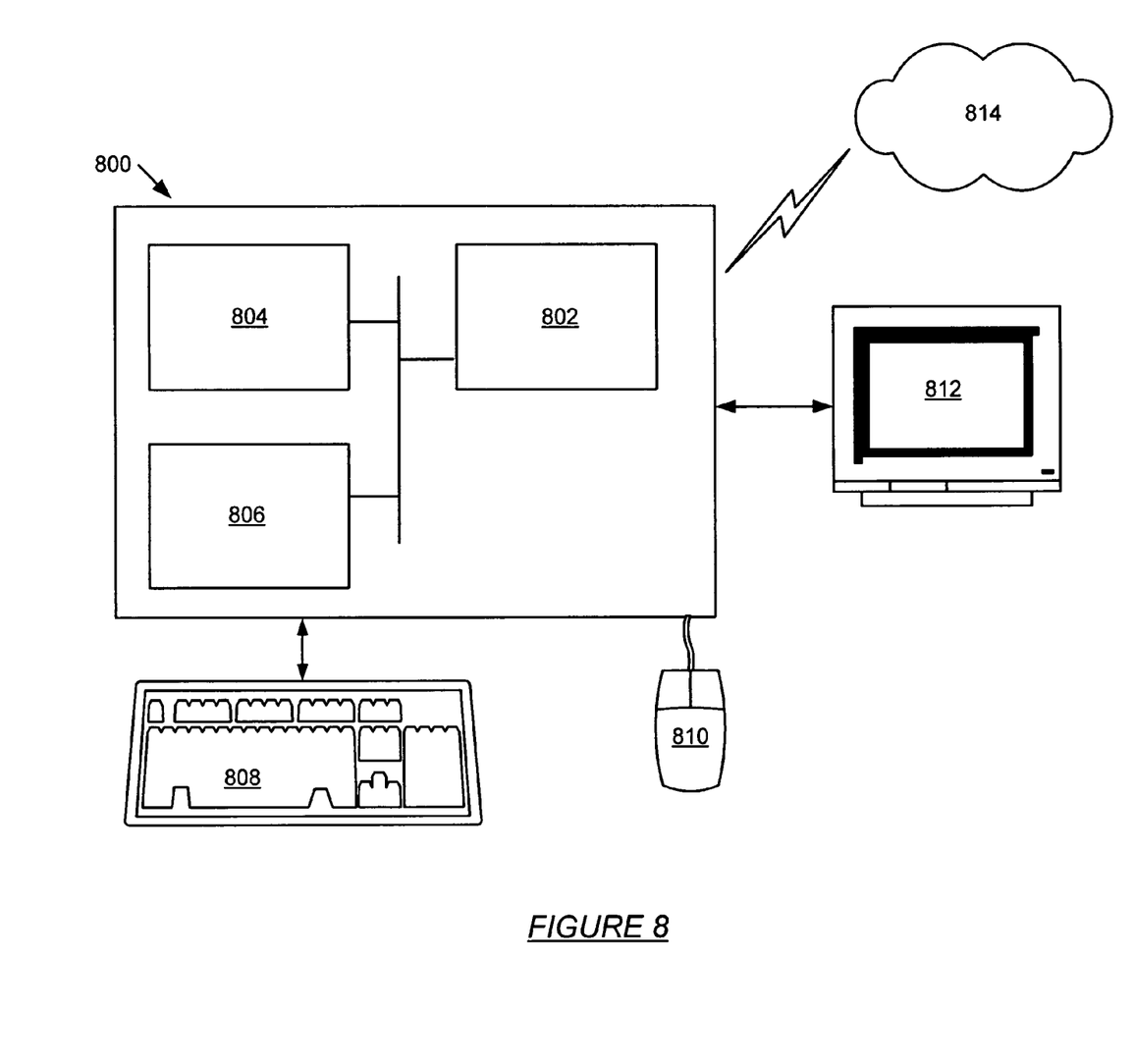
FIG. 8 shows a diagram of a computer system in accordance with one embodiment of the invention.

Embodiments of the invention may be implemented on virtually any type of computer regardless of the platform being used. For example, as shown in FIG. 8, a computer system (800) includes a processor (802), associated memory (804), a storage device (806), and numerous other elements and functionalities typical of today's computers (not shown). The computer (800) may also include input means, such as a keyboard (808) and a mouse (810), and output means, such as a monitor (812). The computer system (800) may be connected to a network (814) (e.g., a local area network (LAN), a wide area network (WAN) such as the Internet, or any other similar type of network) via a network interface connection (not shown). Those skilled in the art will appreciate that these input and output means may take other forms.

Further, those skilled in the art will appreciate that one or more elements of the aforementioned computer system (800) may be located at a remote location and connected to the other elements over a network. Further, embodiments of the invention may be implemented on a distributed system having a plurality of nodes, where each portion of the invention (e.g., operating system, file system, storage pool, disk, system call interface, data management unit, storage pool allocator, metaslab allocator, I/O management module, compression module, encryption module, checksum module, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for priority-based allocation in a storage pool, comprising:
   receiving a first request to write a first data item in the storage pool,
      wherein the storage pool comprises a physical disk,
      wherein the physical disk comprises a plurality of metaslabs, and
      wherein each of the plurality of metaslabs comprises a contiguous region of data;
   determining a first target metaslab selected from the plurality of metaslabs by comparing a first plurality of allocation priorities,
      wherein each of the first plurality of allocation priorities is associated with one of the plurality of metaslabs;
   allocating a first block to the first target metaslab;
   writing the first block to the first target metaslab;
   dynamically modifying an allocation priority selected from the first plurality of allocation priorities according to a block allocation policy after writing the first block to the target metaslab to obtain a modified first plurality of allocation priorities, wherein the first block comprises a first portion of the first data item;
   determining a second target metaslab selected from the plurality of metaslabs by comparing the modified first plurality of allocation priorities;
   allocating a second block to the second target metaslab; and
   writing the second block to the second target metaslab, wherein the second block comprises a second portion of the first data item.

2. The method of claim 1, further comprising:
   receiving a second request to write a second data item in the storage pool;
   determining a second target metaslab selected from the plurality of metaslabs by comparing
      a second plurality of allocation priorities,
      wherein each of the second plurality of allocation priorities is associated with one of the plurality of metaslabs;
   allocating a second block to the second target metaslab; and
   writing the second block to the second target metaslab,
      wherein the second block comprises a portion of the second data item.

3. The method of claim 2, wherein:
   the first request is associated with a first software process,
   the second request is associated with a second software process,
   the first plurality of allocation priorities is based on a characteristic of the first software process, and
   the second plurality of allocation priorities is based on a characteristic of the second software process.

4. The method of claim 3, wherein the first software process is associated with a first file system using the storage pool, and the second software process is associated with a second file system using the storage pool.

5. The method of claim 1, further comprising:
   changing a power state of a storage device in the storage pool based on the allocation priority being modified.

6. The method of claim 1, wherein the block allocation policy is based on available storage capacities of a plurality of storage devices in the storage pool.

7. The method of claim 1, wherein the block allocation policy is based on performance characteristics of a plurality of storage devices in the storage pool.

8. The method of claim 1, wherein the block allocation policy is based on relative physical locations of the plurality of metaslabs on at least one storage device in the storage pool.

9. The method of claim 1, wherein the block allocation policy is based on a predicted state of the storage pool.

10. The method of claim 1, wherein the block allocation policy is designed to increase a data transfer rate associated with the storage pool.

11. The method of claim 1, wherein the block allocation policy is designed to reduce power consumption associated with the storage pool.

12. The method of claim 1, wherein the block allocation policy is designed to reduce a financial cost of maintaining the storage pool.

13. The method of claim 1, wherein the first target metaslab is further determined based on an allocation priority request issued by a software process with which the first data item is associated.

14. The method of claim 13, wherein the allocation priority request is effective only if the software process has a sufficient privilege level.

15. The method of claim 1, wherein the plurality of metaslabs is distributed across a plurality of storage devices.

16. The method of claim 1, wherein at least one allocation priority selected from the first plurality of allocation priorities is initially user-assigned.

17. A system comprising:
   a storage pool comprising a physical disk, wherein the physical disk comprises a plurality of metaslabs, wherein each of the plurality of metaslabs comprises a contiguous region of data;
   a first plurality of allocation priorities, wherein each of the plurality of allocation priorities is associated with one of the plurality of metaslabs; and
   a file system configured to:
      receive a request to write a data item in the storage pool;

determine a first target metaslab selected from the plurality of metaslabs by comparing the plurality of allocation priorities;

allocate a first block to the target metaslab;

write the first block to the first target metaslab, dynamically modify an allocation priority selected from the first plurality of allocation priorities according to a block allocation policy after writing the first block to the first target metaslab to obtain a first modified plurality of allocation priorities, wherein the first block comprises a first portion of the data item;

determine a second target metaslab selected from the plurality of metaslabs by comparing the first modified plurality of allocation priorities;

allocate a second block to the second target metaslab; and write the second block to the second target metaslab, wherein the second block comprises a second portion of the data item.

18. A computer readable medium comprising executable instructions for priority-based allocation in a storage pool by:

receiving a request to write a data item in the storage pool, wherein the storage pool comprises a physical disk, wherein the physical disk comprises a plurality of metaslabs, and wherein each of the plurality of metaslabs comprises a contiguous region of data;

determining a first target metaslab selected from the plurality of metaslabs by comparing a plurality of allocation priorities, wherein each of the plurality of allocation priorities is associated with one of the plurality of metaslabs;

allocating a first block to the target metaslab;

writing the first block to the first target metaslab, dynamically modifying an allocation priority selected from the first plurality of allocation priorities according to a block allocation policy after writing the first block to the first target metaslab to obtain a first modified plurality of allocation priorities, wherein the first block comprises a portion of the data items;

determining a second target metaslab selected from the plurality of metaslabs by comparing the first modified plurality of allocation priorities;

allocating a second block to the second target metaslab; and writing the second block to the second target metaslab, wherein the second block comprises a second portion of the data item.

* * * * *